US007301387B2

(12) United States Patent
Zou

(10) Patent No.: US 7,301,387 B2
(45) Date of Patent: Nov. 27, 2007

(54) SQUARING CELL IMPLEMENTING TAIL CURRENT MULTIPICATION

(75) Inventor: Min Z Zou, Milpitas, CA (US)

(73) Assignee: Linear Technology Corporation, Milpitas, CA (US)

( * ) Notice: Subject to any disclaimer, the term of this patent is extended or adjusted under 35 U.S.C. 154(b) by 14 days.

(21) Appl. No.: 11/253,565

(22) Filed: Oct. 20, 2005

(65) Prior Publication Data

US 2007/0090868 A1 Apr. 26, 2007

(51) Int. Cl.
*G06F 7/556* (2006.01)

(52) U.S. Cl. ....................................... 327/349; 327/348

(58) Field of Classification Search ................ 327/349, 327/348

See application file for complete search history.

(56) References Cited

U.S. PATENT DOCUMENTS 5,146,108 A * 9/1992 Tamura et al. .............. 327/125

5,485,119 A * 1/1996 Kimura ...................... 330/253

OTHER PUBLICATIONS

Gilbert, "A New Wide-Band Amplifier Technique", IEEE Journal of Solid-State Circuits, vol. SC-3, No. 4, Dec. 1968, pp. 353-365.

* cited by examiner

*Primary Examiner*—Kenneth B. Wells
(74) *Attorney, Agent, or Firm*—McDermott Will & Emery LLP

(57) ABSTRACT

A current squaring cell is provided for producing an output current that correlates to the square of an input signal current. The current squaring cell comprises a first circuit portion, which receives a first tail current that is positively proportional to the input signal current, and a second circuit portion, which connects to the first circuit portion and receives a second tail current that is negatively proportional to the input signal current.

31 Claims, 8 Drawing Sheets

SQUARING CELL IMPLEMENTING TAIL CURRENT MULTIPICATION

RELATED APPLICATION

This application contains subject matter related to U.S. application Ser. No. 11/166,089 now U.S. Pat. No. 7,259, 620, Ser. No. 11/166,279 now U.S. Pat. No. 7,262,661 and Ser. No. 11/206,070 now U.S. Pat. No. 7,268,608, filed Jun. 27, 2005, Jun. 27, 2005 and Aug. 18, 2005, respectively of Min Z. Zou, the disclosures of which are hereby incorporated in the present disclosure.

TECHNICAL FIELD

The subject matter presented herein relates to a circuit architecture for squaring an input current.

BACKGROUND

A circuit for current multiplication is illustrated in FIG. 1. Based on translinear loop equations, the following relationships hold:

$$V_{be1}+V_{be2}+V_{be3}=V_{be4}+V_{be5}+V_{be6}, \quad (1)$$

$$I_{c1}*I_{c2}*I_{c3}=I_{c4}*I_{c5}*I_{c6}, \text{ and} \quad (2)$$

$$I_{out}=I_{c6}=I_{c1}*I_{c2}/I_{c5} \quad (3)$$

where $V_{be1}$ represents the voltage measured between the anode terminal and cathode of a first diode 110 ($Q_1$); $V_{be2}$ represents the voltage between the base and emitter of a first transistor 120 ($Q_2$); $V_{be3}$ represents the voltage between the base and emitter of a second transistor 130 ($Q_3$); $V_{be4}$ represents the voltage between the anode and the cathode of a second diode 140 ($Q_4$); $V_{be5}$ represents the voltage between the base and emitter electrode of a third transistor 150 ($Q_5$); and $V_{be6}$ represents the voltage between the base and emitter of a fourth transistor 160 ($Q_6$). In addition, $I_{c6}$ represents the current measured at the cathode of the first diode 110 ($Q_1$); $I_{c2}$ represents the current at the collector electrode of the first transistor 120 ($Q_2$); $I_{c3}$ represents the current at the collector of the second transistor 130 ($Q_3$); $I_{c4}$ represents the current at the cathode of the second diode 140 ($Q_4$); $I_{c5}$ represents the current at the collector of the third transistor 150 ($Q_5$); and $I_{c6}$ represents the current at the collector of the fourth transistor 160 ($Q_6$).

Although the circuit presented in FIG. 1 produces an output current $I_{out}$ that is a multiple of its input current, its output current is not necessarily a squared input current. Having a circuit that produces a squared input current has a number of practical applications. For example, a logarithmic amplifier for measuring the power of an RF signal often requires that the amplifier exhibit conformity to the known true square law over a broad dynamic range and be relatively independent of temperature. The subject matter described herein presents circuitry having these characteristics.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Figure 1:
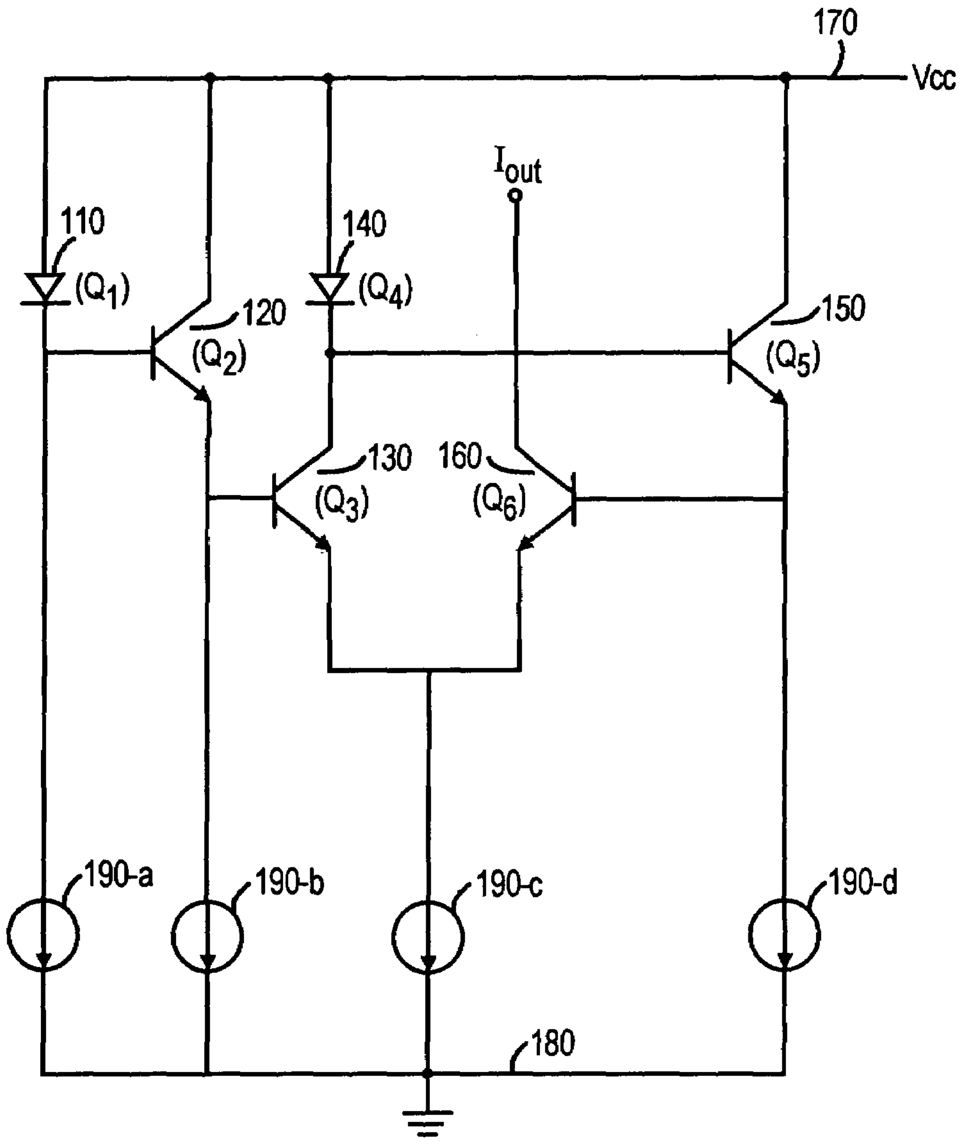
FIG. 1 (PRIOR ART)
FIG. 1 (Prior Art) depicts a circuit for current multiplication.
Figure 2:
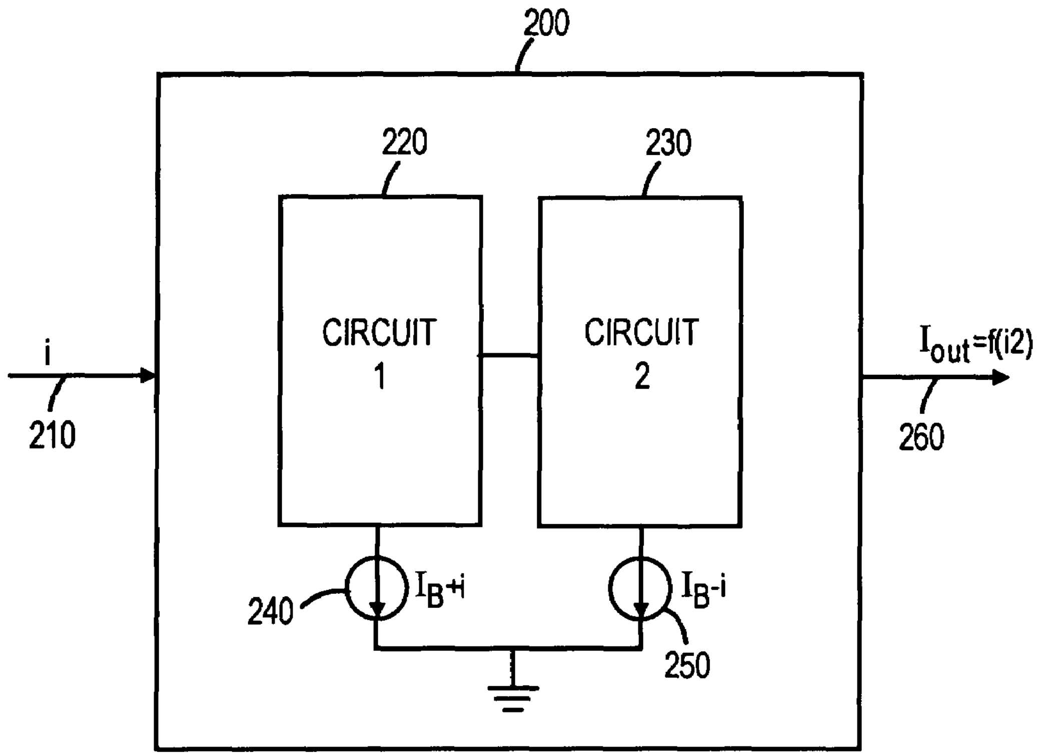
FIG. 2 depicts an exemplary construct of a current squaring cell, according to an embodiment of the present invention.
Figure 7A:
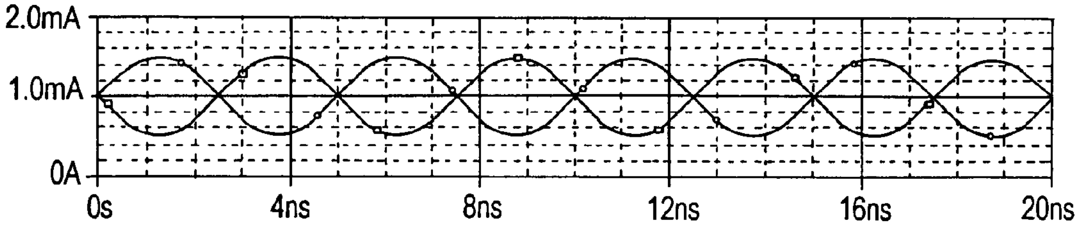
FIGS. 7A-7D provide plots of current waveforms at different locations of a current squaring cell with respect to an input signal at a rate of 200 MHz.
Figure 8A:
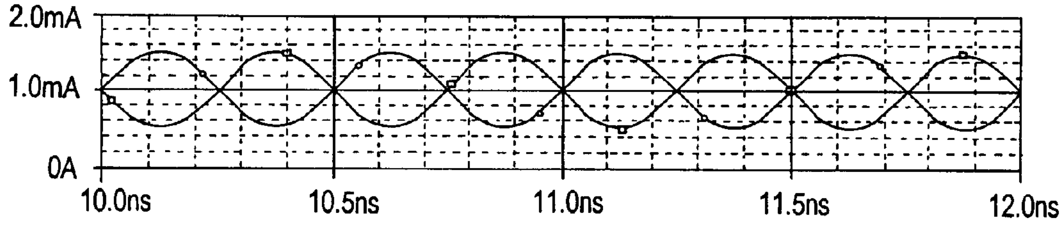
FIGS. 8A-8D provide plots of current waveforms at different locations of a current squaring cell with respect to an input signal at a rate of 2 GHz.

FIG. 2 depicts an exemplary circuit construct of a current squaring cell 200, according to an embodiment of the present invention. The circuit construct 200 receives, as an input, a current i 210 and produces, as an output, a current $I_{out}$ 260 corresponding to a function of the squared input current or $f(i^2)$. The circuit construct 200 comprises a first circuit 220, having a first tail current 240 of a magnitude $I_B$+i, and a second circuit 230, having a second tail current 250 of a magnitude $I_B$−i. In this construct, the current $I_B$ represents a constant current source such as a DC quiescent current and i represents a dynamic input current signal. This is illustrated in FIGS. 7A and 8A, where the constant line at the level of 1.0 mA represents a constant current source $I_B$ and the waveforms in these figures represent the input current signal i. The first circuit 220 and the second circuit 230, the content of which will be described later, are interconnected as shown.

Figure 3:
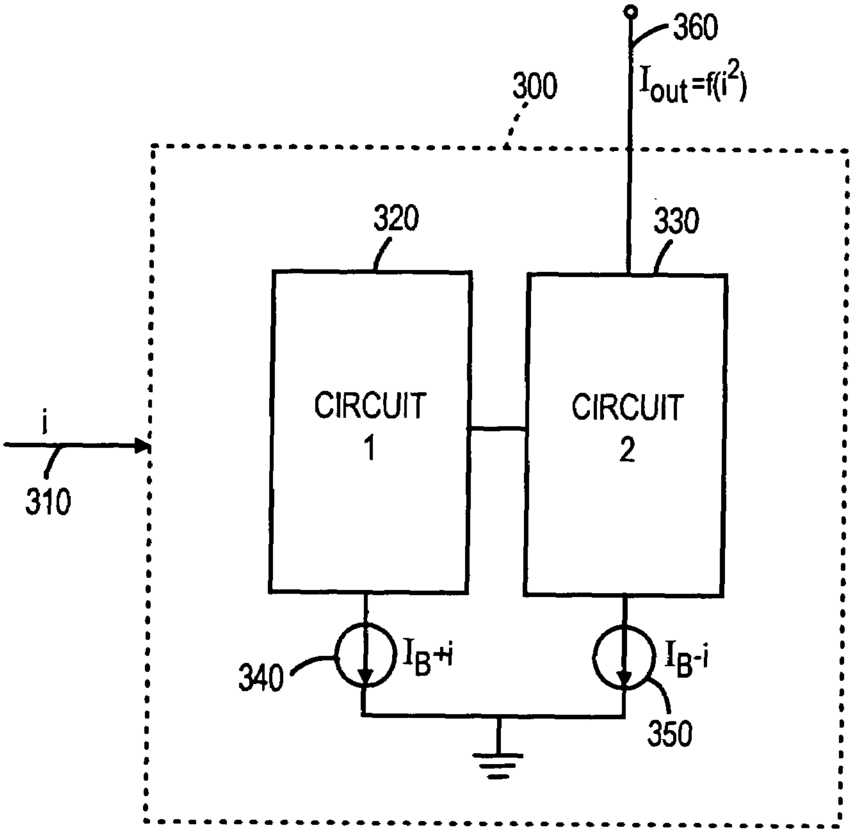
FIG. 3 depicts a first embodiment of a current squaring cell according to the present invention.

FIG. 3 depicts a current squaring cell 200 according to a first embodiment 300 of the present invention. Embodiment 300 comprises a first circuit 320, having a first tail current 340 of a magnitude $I_B$+i, and a second circuit 330, having a second tail current 350 of a magnitude $I_B$−i, where an output current, $I_{out}$ 360, is produced by the second circuit 330 and is a function of squared input current i at input 310.

Figure 4:
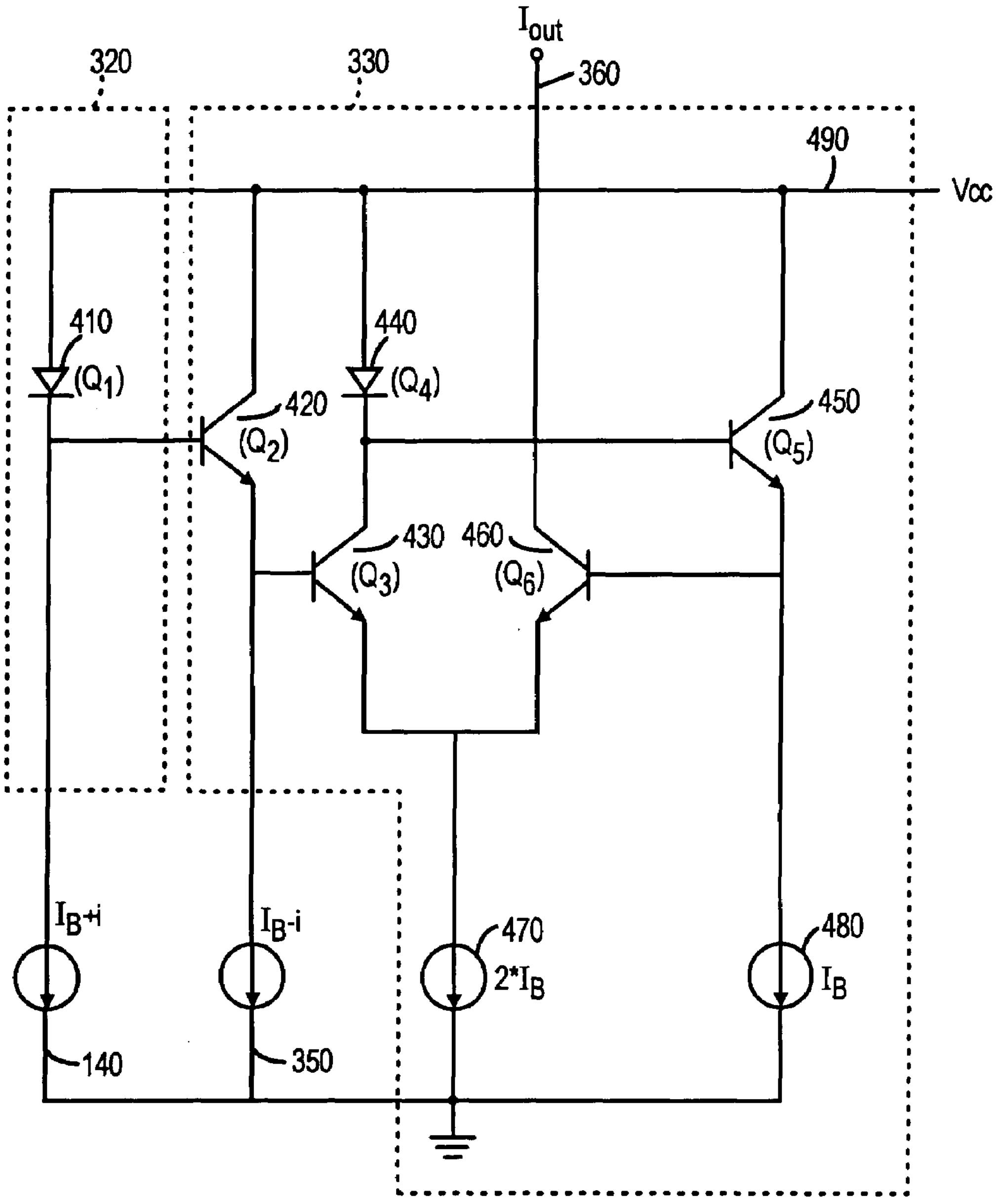
FIG. 4 depicts an exemplary circuit implementation of the first embodiment of current squaring cell.

FIG. 4 depicts an exemplary circuit implementation of embodiment 300 of current squaring cell 200. Circuit 320 of embodiment 300 includes a first component 410 ($Q_1$), which may be realized using a diode having its anode terminal connected to a source of reference voltage Vcc and its cathode terminal connected to the tail current 340 of $I_B$+i, as shown in FIG. 4. Alternatively, the component 410 may be realized using a transistor (not shown) having its base electrode and collector electrode coupled together to connect to the reference voltage Vcc source and its emitter electrode connected to the tail current 340.

Circuit 330 of embodiment 300 comprises a first transistor 420 ($Q_2$), a second transistor 430 ($Q_3$), a second component 440 ($Q_4$), a third transistor 460 ($Q_6$), and a fourth transistor 450 ($Q_5$) interconnected as shown. Similarly, the second component 440 may be realized using either a diode (as shown) or a transistor. When a diode is utilized, its anode terminal may serve as the positive terminal of the second component 440 and its cathode terminal may serve as the negative terminal of the second component 440. When a transistor is utilized, its base electrode and its collector electrode are coupled together connecting to the reference voltage source Vcc and its emitter electrode serve as the negative terminal of the second component 440.

The base electrode of the first transistor 420 is connected to the negative terminal of the first component 410. The collector electrode of the first transistor 420 is connected to the reference voltage source Vcc and the emitter electrode of the first transistor 420 is connected to both the tail current source 350 of $I_B$−i and the base electrode of the second transistor 430. The collector electrode of the second transistor 430 is connected to the negative terminal of the second component 440, whose positive terminal is connected to the reference voltage source Vcc.

The emitter electrode of the second transistor 430 is coupled with the emitter electrode of the fourth transistor 460 and together are connected to a third tail current 470 that has a constant magnitude of 2*$I_B$.

The base electrode of the third transistor 450 is connected to the negative terminal of the second component 440. The emitter electrode of the third transistor 450 is coupled with the base electrode of the fourth transistor 460 and together connecting to a fourth tail current source 480 that has a constant magnitude of $I_B$. The collector electrode of the third transistor 450 is connected to the source of reference voltage Vcc. The collector electrode of the fourth transistor 460 serves as a terminal for the output current 360 $I_{out}$.

The output current $I_{out}$ is a function of the squared input current i. This can be shown from the translinear loop equations as follows. Since the following equalities hold:

$$V_{be1}+V_{be2}+V_{be3}=V_{be4}+V_{be5}+V_{be6}, \quad (4)$$

$$I_{c1}*I_{c2}*I_{c3}=I_{c4}*I_{c5}*I_{c6}, \text{ and} \quad (5)$$

$$I_{out}=I_{c6}=I_{c1}*I_{c2}/I_{c5} \quad (6)$$

where $V_{be1}$ represents the voltage between the positive and the negative terminals of component 410 ($Q_1$); $V_{be2}$ represents the voltage between the base electrode and the emitter electrode of the first transistor 420 ($Q_2$); $V_{be3}$ represents the voltage between the base electrode and the emitter electrode of a second transistor 430 ($Q_3$); $V_{be4}$ represents the voltage between the positive and negative terminals of component 440 ($Q_4$); $V_{be5}$ represents the voltage between the base electrode and the emitter electrode of a third transistor 450 ($Q_5$); and $V_{be6}$ represents the voltage between the base electrode and the emitter electrode of a fourth transistor 460 ($Q_6$). In addition, $I_{c1}$ represents the current at the negative terminal of component 410 ($Q_1$); $I_{c2}$ represents the current at the collector electrode of the first transistor 420 ($Q_2$); $I_{c3}$ represents the current at the collector electrode of the second transistor 430 ($Q_3$); $I_{c4}$ represents the current at the negative terminal of the second component 440 ($Q_4$); $I_{c5}$ represents the current at the collector electrode of the third transistor 450 ($Q_5$); and $I_{c6}$ represents the current at the collector electrode of the fourth transistor 460 ($Q_6$). Since $I_{c1}=I_B+i$, $I_{c2}=I_B-i$, and $I_{c5}=I_B$, by substitution, one can derive the following:

$$I_{out}=(I_B+i)*(I_B-i)/I_B=(I_B-i^2)/I_B=I_B-i^2/I_B. \quad (7)$$

That is, the output current of the second circuit 330 is a function of squared input current i. In addition, when $I_B$ is a zero-TC current source, the output current $I_{out}$ is also independent of temperature.

The above characteristics hold when the frequency of the input signal i is within a certain frequency range. When frequency increases, the negative terminal of the first component 410 ($Q_1$) connected to the first tail current ($I_B$+i) and the emitter electrode of the first transistor 420 ($Q_2$) connected to the second tail current ($I_B$−i) may observe different impedances. Consequently, the current flow to component 410 ($I_{c1}$) may differ from the current flow to the first transistor 420 ($I_{c2}$) in terms of both amplitude and in phase delays. The higher the frequency, the larger the difference may be. This can be seen from the following. The input signal i may generally take a form of $i=I_0*\cos(\omega t)$ and the expressions of $I_{c1}=I_B+i$ and $I_{c2}=I_B-i$ may then be expanded as:

$$I_{c1}=a*\{I_B+I_0*\cos(\omega t+\Phi_1)\}, \quad (8)$$

$$I_{c2}=b*\{I_B+I_0*\cos(\omega t+\Phi_2)\}, \quad (9)$$

where $\Phi_1$ and $\Phi_2$ represent the phase of the signals.

As a consequence, the product of $I_{c1}$ and $I_{c2}$ may include both a fundamental frequency as well as an additive DC current component which is a function of both the amplitude of the input signal i ($I_0$) and the phase difference ($\Phi_1-\Phi_2$) occurring at a certain frequency. That is, $$I_{c1}*I_{c2}=a*b*(I^2_B-i^2)+c*i+\text{additive DC current }(I_0, \Phi_1-\Phi_2) \quad (10)$$

In addition to this discrepancy, the assumed condition $I_{c3}=I_{c4}$ may not hold at a high frequency. When the frequency of the input signal i is increased, the current observed at the negative terminal of the second component 440 may be delayed compared with the current at the collector electrode of the second transistor 430. This may also result in bleeding of a signal at the fundamental frequency into the output signal 360.

Furthermore, when the input signal i has a magnitude that is comparable to that of $I_B$, component 410 (which has the first tail current $I_B$+i) and the first transistor 420 (whose emitter electrode is connected to the second tail current $I_B$−i) may behave quite differently during both positive and negative cycles of the input current i. This may be due to the difference in resistance measured between the negative terminal of the first component 410 and the emitter electrode of the first transistor 420.

Although embodiment 300 may produce an output current 360 as a function of the squared input current i, it may not behave as such when the above conditions no longer hold in high frequency input situations. In situations where the input current signal is of high frequency, another embodiment 500 of current squaring cell 200, described below, may be employed.

Figure 5:
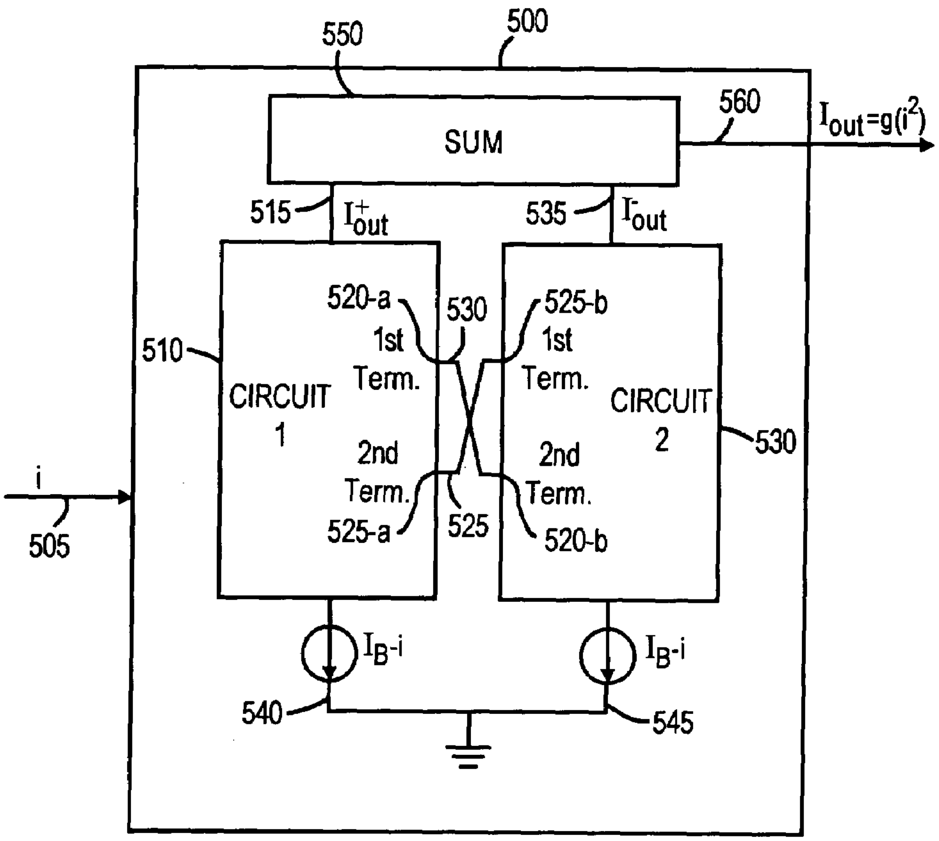
FIG. 5 depicts a second embodiment of a current squaring cell.

Referring to FIG. 5, embodiment 500 comprises a first circuit 510, having a first tail current 540 of magnitude $I_B$+i and a first output current 515 $I^+_{out}$, a second circuit 530, having a second tail current 545 of magnitude $I_B$−i and a second output current 535 $I^-_{out}$, and a sum circuit 550. The first circuit 510 receives an input current signal i 505 and produces the output current $I^+_{out}$, which is a function of the squared input current signal i. Similarly, circuit 530 receives an input current signal i 505 and produces output current $I^-_{out}$, which is a function of the squared input current signal i.

The sum circuit 550 receives both the first output current 515 $I^+_{out}$ of the circuit 510 and the second output current 535 $I^-_{out}$ of circuit 530 and produces an output current 560 $I_{out}$. The output current 560 may be represented as $I_{out}=g(I^{30}_{out}, I^-_{out})$ and the function g may be designed so that the output current 560 $I_{out}$ remains a function of the squared input current signal, e.g., $g(I^+_{out}, I^-_{out})=I^+_{out}+I^-_{out}$ which is the sum of the two inputs.

Circuit 510 and circuit 530 may be coupled through connections 520 and 525. Circuit 510 and circuit 530 may be realized using symmetric circuitry, each of which has two connecting terminals. For example, circuit 510 has a first connecting terminal 520-*a* and a second connecting terminal 525-*a*. Similarly, circuit 530 has a first connecting terminal 525-*b* and a second connecting terminal 520-*b*. When circuit 510 is coupled with circuit 530, the first connecting terminal 520-*a* of circuit 510 is coupled with the second connecting terminal 520-*b* of circuit 530 and the second connecting terminal 525-*a* of circuit 510 is coupled with the first connecting terminal 525-*b* of circuit 530. This cross connection is shown in FIG. 5 and is made more clear in FIG. 6.

Figure 6:
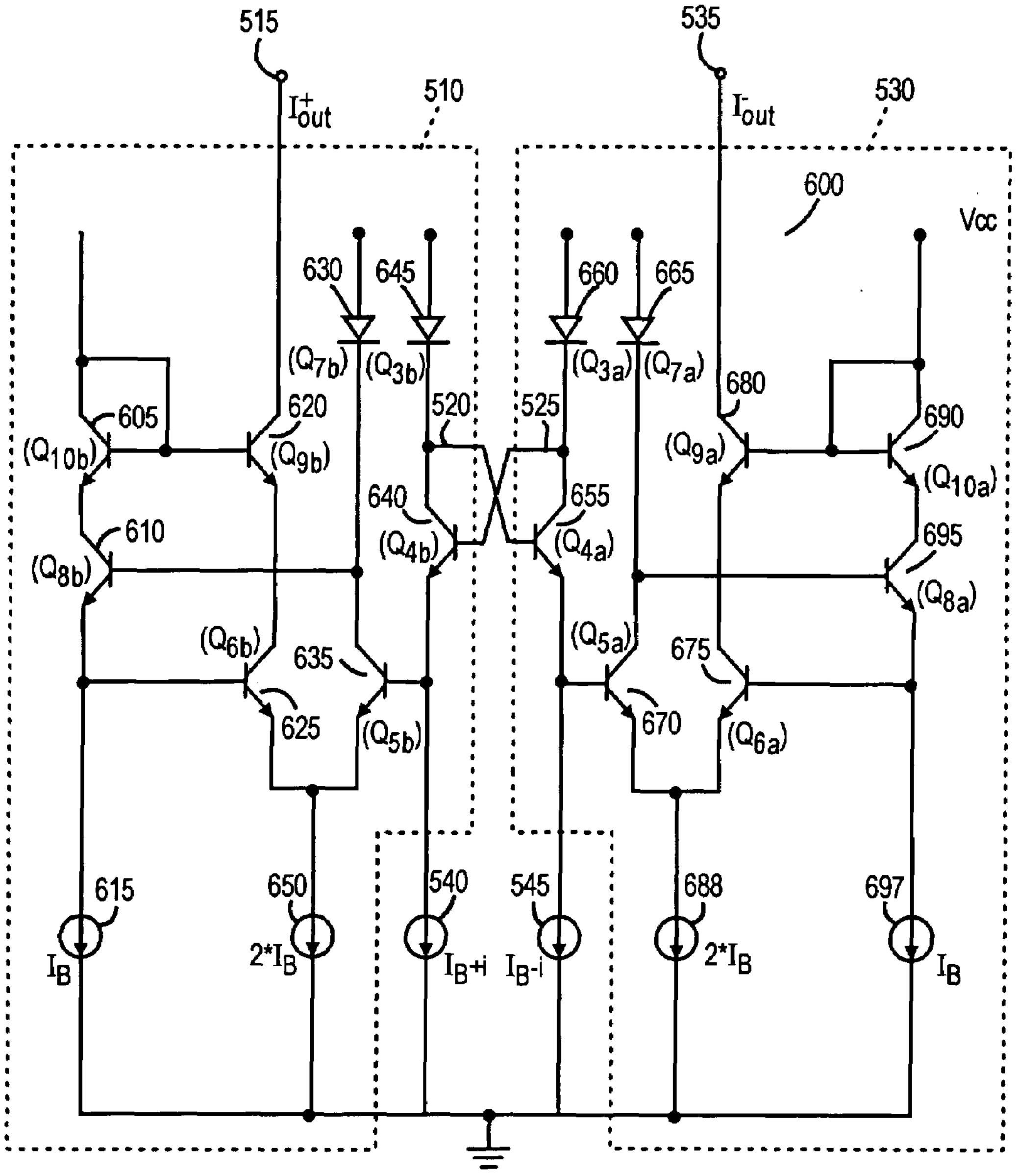
FIG. 6 depicts an exemplary circuit implementation of the second embodiment.

FIG. 6 depicts an exemplary implementation of circuit 510 and circuit 530. The left portion in FIG. 6 shows an exemplary circuitry that implements circuit 510, the right portion of FIG. 6 shows an exemplary circuitry that implements circuit 530. In this embodiment, the internal construct of circuit 510 is a mirror image of the construct of circuit 530 except that the tail current of circuit 510 ($I_B$+i) is different from the tail current of circuit 530 ($I_B$−i).

Circuit 510 comprises a first component 645 ($Q_{3b}$), a first transistor 640 ($Q_{4b}$), a second transistor 635 ($Q_{5b}$), a third transistor 625 ($Q_{6b}$), a second component 630 ($Q_{7b}$), a fourth transistor 620 ($Q_{9b}$), a fifth transistor 610 ($Q_{8b}$), and a sixth transistor 605 ($Q_{10b}$), interconnected as shown. The first and/or the second components 645 and 630 may be realized using a diode (as shown in FIG. 6) with its anode terminal serving as the positive terminal and its cathode terminal serving as the negative terminal of first and second components 645 and 630. Alternatively, a transistor may be employed to realize the first and/or second components 645 and 630 (not shown), where the base electrode and the collector electrode of such a transistor are coupled together to serve as the positive terminal and its emitter electrode serves as the negative terminal of the first and/or second components 645 and 630.

The positive terminal of the first component 645 is connected to a reference voltage Vcc source and the negative terminal of the first component 645 is connected to the collector electrode of the first transistor 640. The emitter electrode of the first transistor 640 is connected to the first tail current ($I_B$+i) 540 as well as the base electrode of the second transistor 635. The collector electrode of the second transistor 635 is connected to the negative terminal of the second component 630 whose positive terminal is connected to the reference voltage Vcc 600. The emitter electrode of the second transistor 635 is coupled with the emitter electrode of the third transistor 625 and together connected to a third tail current 650 with a current strength of 2*$I_B$. The third transistor 625 is connected with the fourth transistor 620 in a serial fashion with the collector electrode of the third transistor 625 coupled with the emitter electrode of the fourth transistor 620. The collector electrode of the fourth transistor 620 corresponds to the first output current 515 $I^{+}_{out}$.

The fifth transistor 610 and the sixth transistor 605 are connected in a serial manner between the reference voltage Vcc 600 and a fourth tail current 615 with a current strength of $I_B$. As shown in FIG. 6, the collector electrode of the fifth transistor 610 is coupled with the emitter electrode of the sixth transistor 605, whose collector electrode is connected to the reference voltage Vcc 600. The base electrode of the fifth transistor 610 is connected to the collector electrode of the second transistor 635 and the base electrode of the sixth transistor 605 is coupled both with its own collector electrode and with the base electrode of the fourth transistor 620.

Circuit 530 comprises a third component 660 ($Q_{3a}$), a seventh transistor 655 ($Q_{4a}$), an eighth transistor 670 ($Q_{5a}$), a ninth transistor 675 ($Q_{6a}$), a fourth component 665 ($Q_{7a}$), a tenth transistor 680 ($Q_{9a}$), an eleventh transistor 695 ($Q_{8a}$), and a twelfth transistor 690 ($Q_{10a}$). As mentioned, circuit 530 is a mirror image of circuit 510. The third component 660 corresponds to the first component 645 and the fourth component 665 corresponds to the second component 630. Similarly, the seventh transistor 655 corresponds to the first transistor 640 except that the emitter of the seventh transistor is connected to the second tail current ($I_B$−i) 545; the eighth transistor 670 corresponds to the second transistor 635; the ninth transistor 675 corresponds to the third transistor 625; the tenth transistor 680 corresponds to the fourth transistor 620; the eleventh transistor 695 corresponds to the fifth transistor 610; the twelfth transistor 690 corresponds to the sixth transistor 605. The corresponding parts of circuit 510 and circuit 530 are also similarly connected.

Circuit 510 and circuit 530, the contents of which are described later, are interconnected as shown. The collector electrode of the first transistor 640 (which also connects to the negative terminal of the first component 645) serves as the first connection terminal 520-*a* of circuit 510 (FIG. 5). The base electrode of the first transistor 640 serves as the second connection terminal 525-*a* of circuit 510. Similarly, the collector electrode of the seventh transistor 655 (which also connects to the negative terminal of the third component 660) serves as the first connection terminal 525-*b* of circuit 530 and the base electrode of the seventh transistor 655 serves as the second connection terminal 520-*b* of circuit 530.

The exemplary implementation circuitry 500 has the following characteristics, referring to its translinear loop equations:

$$V_{Q3a}+V_{Q4b}+V_{Q5b}=V_{Q7b}+V_{Q8b}+V_{Q6b}, \tag{11}$$

$$V_{Q3b}+V_{Q4a}+V_{Q5a}=V_{Q7a}+V_{Q8a}+V_{Q6a}, \tag{12}$$

$$I_{Q3a}*I_{Q4b}*I_{Q5b}=I_{Q7b}*I_{Q8b}*I_{Q9b}, \tag{13}$$

$$I_{Q3b}*I_{Q4a}*I_{Q5a}=I_{Q7a}*I_{Q8a}*I_{Q9a}, \tag{14}$$

That is, circuit 510, when considered together with the third component 660, the seventh transistor 655, and the second tail current ($I_B$−i) 545, has the same properties as the circuit shown in FIG. 4. Similarly, circuit 530, when considered together with the first component 645, the first transistor 640, and the first tail current ($I_B$+i) 540, has the same properties as the circuit shown in FIG. 4. Therefore, the first output current 515 $I^{+}_{out}$ and the second output current 535 $I^{+}_{out}$ are both a function of the squared input current i.

The sum circuit 550 may linearly combine the first and second output currents, for example, using a summation. Such a linear combination of the first output current 515 $I^{+}_{out}$ of circuit 510 and the second output current 535 $I^{-}_{out}$ of circuit 530 produces the output current 560 $I_{out}$, which is also a function of the squared input current signal i.

As can be seen, in the second embodiment 500 of current squaring cell, by using balanced or symmetric current squaring cells, the additive DC current and the signal at the fundamental frequency at the first output current $I^{+}_{out}$ and the second output current $I^{-}_{out}$, although having the same amplitudes, are out of phase with respect to each other. The impact of high frequencies on the additive DC current and the signal at the fundamental frequency are canceled out when the first output current $I^+_{out}$ and the second output current $I^-_{out}$ are combined at the sum circuit 550. In this way, the expected relationship under the square law is maintained even under high frequency situations. Notably, in the exemplary implementation as shown in FIG. 6, the first tail current source ($I_B$+i) 540 and the second tail current source ($I_B$−i) 545 are loaded by the same impedance. In addition, the impact of positive and negative cycles (that exist when the amplitude of input current i is comparable to that of $I_B$) on circuit 510 and circuit 530 is also canceled out when $I^+_{out}$ and $I^-_{out}$ are combined.

In addition, it is known that the square law relationship, as discussed above, holds when the effect of limited early voltages is assumed to be negligible. This assumption, however, may not hold when input signal frequency is high, in which case a voltage may not arise high enough in a short period of time to avoid the early voltage impact. The second embodiment 500 of current squaring cell also exhibits the characteristic of canceling such early voltage impact. This is due to the additional use of the fourth and the sixth transistors 620 and 605 in circuit 510 as well as the tenth and the twelfth transistors 680 and 690 in circuit 530.

In the exemplary circuit implementation shown in FIG. 4, assuming $V_{ce1}=1*V_{be}$, where $V_{ce1}$ represents the voltage between the collector and emitter electrodes of the first electronic component ($Q_1$) (in the circuit shown, it is between the anode terminal and cathode terminal of a diode), the following relationships exist:

$$V_{ce1}=1*V_{be}; \quad (15)$$

$$V_{ce2}=2*V_{be}; \quad (16)$$

$$V_{ce3}=2*V_{be}; \quad (17)$$

$$V_{ce4}=1*V_{b}; \quad (18)$$

$$V_{ce5}=2*V_{be}; \quad (19)$$

where the voltage $V_{ce6}$ between the collector and emitter electrodes of $Q_6$ (or the fourth transistor 450) depends on output loading. However, based on part of the circuit as shown in FIG. 6, we now have:

$$V_{ce3b}=1*V_{be}; \quad (20)$$

$$V_{ce4a}=1*V_{be}; \quad (21)$$

$$V_{ce5a}=2*V_{be}; \quad (22)$$

$$V_{ce7a}=1*V_{be}; \quad (23)$$

$$V_{ce8a}=1*V_{be}; \quad (24)$$

$$V_{ce6a}=2*V_{be} \quad (25)$$

where $V_{ce3b}$ represents the voltage between the two terminals of component $Q_{3b}$ (the first component 645), $V_{ce4a}$ represents the voltage between the collector and emitter electrodes of $Q_{4a}$ (the seventh transistor 655), etc. As can be seen, within the translinear loop formed by $Q_{3b}$, $Q_{4a}$, $Q_{5a}$, $Q_{7a}$, $Q_{8a}$, and $Q_{6a}$, corresponding components pairs ($Q_{3b}$-$Q_{7a}$, $Q_{4a}$-$Q_{8a}$, and $Q_{5a}$-$Q_{6a}$) all have matched voltages. Notably, the voltage $V_{ce6}$ now no longer depends on the output loading. Therefore, the impact of limited Early voltage may be eliminated.

FIGS. 7A-7D provide plots of current measurements made at different locations of the current squaring cell circuit shown in FIG. 6 when the input signal i has a frequency of 200 MHz. FIG. 7A shows the waveforms of the first tail current ($I_B$+i) and the second tail current ($I_B$−i), where $I_B$ is shown at a constant level of 1.0 mA and the amplitude of the input current signal i is around |0.5 mA|.

Figure 7B:
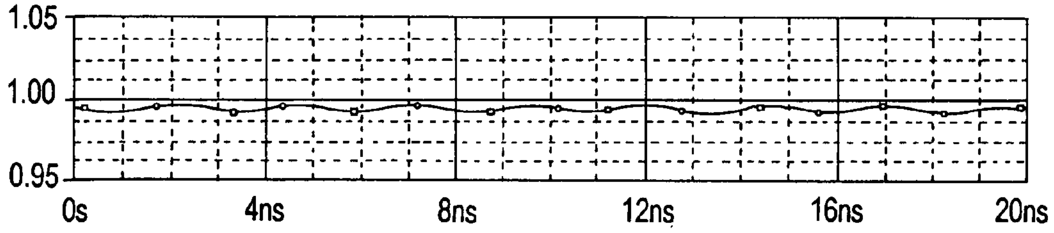

FIG. 7B shows that the current flowing through the fourth component 665 and the current measured at the collector electrode of the eighth transistor 670 are almost identical when the frequency is 200 MHz. In FIG. 7B, the first plotted curve (marked by a square) represents the ratios of the current flowing through the fourth component 665 to that of the eighth transistor 670 and it can be seen that the ratios on the curve are quite close to 1.0. Similarly, the second plotted curve (marked by a diamond shape) represents the ratios of the current flowing through the second component 630 to that of the second transistor 635 and it can be seen that the ratios on the curve are also quite close to 1.0.

Figure 7C:
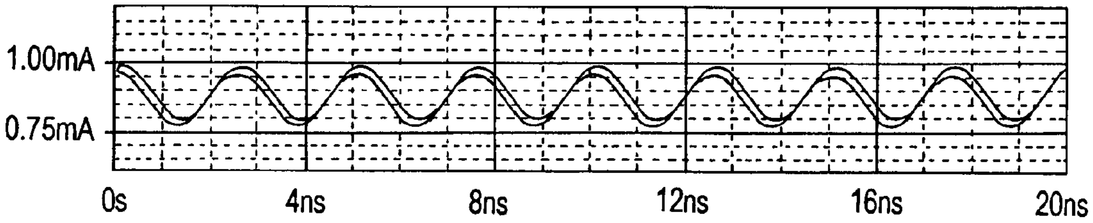
Figure 7D:
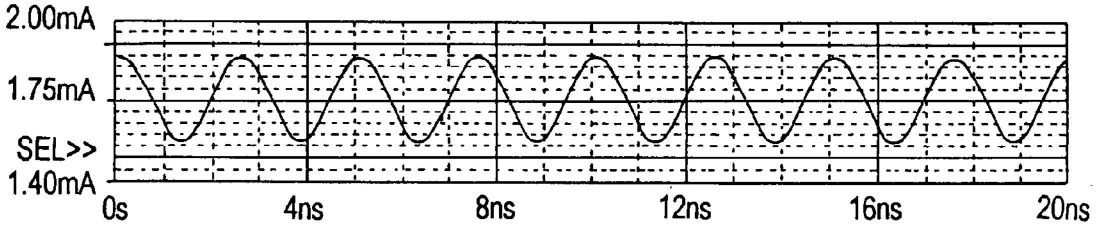

FIG. 7C shows two plotted curves representing the amplitudes of the first output current $I^+_{out}$ and that of the second output current $I^-_{out}$, respectively. It can be seen that at a low frequency, the two output currents present similar circuit behavior, having substantially the same amplitudes and phases. FIG. 7D shows a curve representing the combined output current $I_{out}$ that is a sum of the two output currents and is a function of the squared input current signal.

FIGS. 8A-8D provide plots of current measurements made at different locations of the current squaring cell circuit shown in FIG. 6 when the input signal i has a high frequency of 2 GHz. FIG. 8A shows the curves representing both the first tail current ($I_B$+i) 540 and second tail current ($I_B$−i) 545.

Figure 8B:
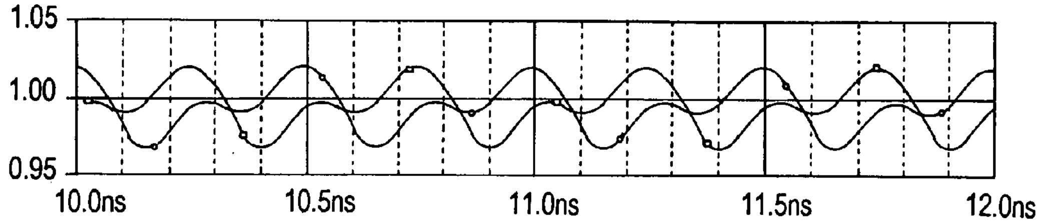

FIG. 8B shows two curves. The one marked with a square represents ratios of the current flowing through the fourth component 665 to that of the eighth transistor 670. It can be seen that most of the ratio values along the first curve are not close to 1.0. That is, at a high frequency of 2 GHz, the currents measured at the positive terminal of the fourth component 665 and at the collector electrode of the eighth transistor 670 no longer have the same phase and amplitude with respect to a given time. The second curve (marked by a diamond shape) represents ratios of the current flowing through the second component 630 to that measured at the collector electrode of the second transistor 635. Similarly, at a high frequency of 2 GHz, the current measured at the positive terminal of the second component 630 and that measured at the collector electrode of the second transistor 635 differ in phases and amplitudes.

Figure 8C:
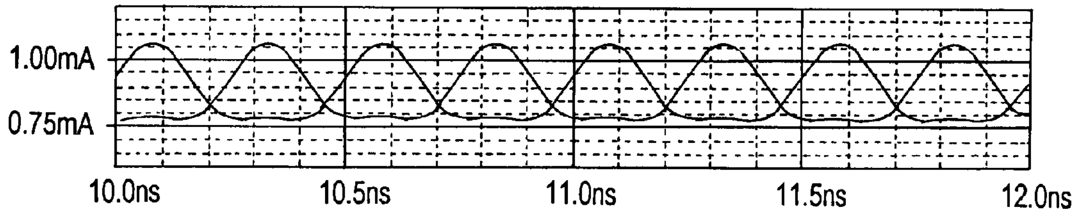

FIG. 8C shows two plotted curves representing the amplitudes of the first output current $I^+_{out}$ and that of the second output current $I^-_{out}$, respectively. It can be seen that at a high frequency, circuit 510 and circuit 530 behave quite differently because of the impact of positive and negative cycles of the input current signal i. For example, the impact of the $I_B$+i is quite different from the impact of $I_B$−i. This is especially evident from the observation that neither of the first output current $I^+_{out}$ or the second output current $I^-_{out}$ maintains a proper waveform as a function of the input waveform as shown in FIG. 8A.

Figure 8D:
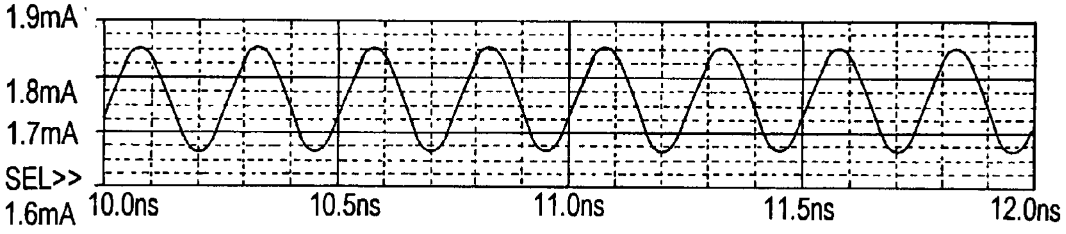

FIG. 8D shows a curve representing the combined output current $I_{out}$ that is a sum of the two output currents and is a function of the squared input current signal. As seen in FIG. 8D, by combining the first output current $I^+_{out}$ and the second output current $I^-_{out}$, the negative impact on both the first output current $I^+_{out}$ and the second output current $I^-_{out}$ is canceled out so that the overall output current $I_{out}$ still presents a proper behavior as a function of the squared input current signal i.

While the disclosure has been made with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A squaring cell, comprising:

a first circuit portion receiving a first tail current positively proportional to an input signal current; and a second circuit portion coupled to the first circuit portion and receiving a second tail current negatively proportional to the input signal current, the first and second circuit portions being operative to develop a product of the first and second tail currents;

wherein an output current of the squaring cell correlates with the square of the input signal current.

2. The squaring cell of claim 1, wherein the output current is responsive to the first tail current and the second tail current.

3. The squaring cell of claim 2, wherein the first tail current is a summation of a DC quiescent current and the input signal current; and the second tail current is a subtraction between the DC quiescent current and the input signal current.

4. The squaring cell of claim 3, wherein the first circuit portion comprises a first component with a first positive terminal and a first negative terminal where the first negative terminal receives the first tail current and the first positive terminal connects to a reference voltage; and the second circuit portion comprises:

a first transistor with its emitter electrode receiving the second tail current, its base electrode connected to the negative terminal of the first component, and its collector electrode connected to the reference voltage, second and third transistors having emitter electrodes thereof coupled together receiving a first constant current, wherein the base electrode of the second transistor is connected to the emitter electrode of the first transistor and the collector electrode of the third transistor is connected to the output current, a second component with a positive terminal and a negative terminal, where the negative terminal is connected to the collector electrode of the second transistor and the positive terminal is connected to the reference voltage, and a fourth transistor having its base electrode connected to the collector electrode of the second transistor, its emitter electrode coupled with the base electrode of the third transistor receiving a second constant current, and its collector electrode connected to the reference voltage.

5. The squaring cell of claim 4, wherein the first component and/or the second component include one of:

a diode with its anode terminal serving as a positive terminal and its cathode terminal serving as a negative terminal; and a transistor with its base electrode and its collector electrode coupled together, where the emitter electrode serves as a negative terminal and the collector electrode as a positive terminal.

6. The squaring cell of claim 4, wherein the first constant current is twice that of the DC quiescent current.

7. The squaring cell of claim 4, wherein the second constant current is the same as the DC quiescent current.

8. The squaring cell of claim 3, wherein the output current of the squaring cell is a summation of a first output current of the first circuit portion and a second output current of the second circuit portion.

9. The squaring cell of claim 8, wherein first output current correlates with the square of the input signal current.

10. The squaring cell of claim 8, wherein the second output current correlates with the square of the input signal current.

11. The squaring cell of claim 8, wherein the first circuit portion comprises:

a first transistor with its emitter electrode receiving the first tail current and its base electrode connected to the second circuit portion;

a first component with a first positive terminal and a first negative terminal having the first negative terminal connected to the collector electrode of the first transistor and the first positive terminal connected to a reference voltage;

second and third transistors having emitter electrodes thereof coupled together receiving a first constant current, wherein the base electrode of the second transistor is connected to the emitter electrode of the first transistor;

a second component with a second positive terminal and a second negative terminal having the second negative terminal connected to the collector electrode of the second transistor and the second positive terminal connected to the reference voltage;

a fourth transistor having its collector electrode connected to the first output current and its emitter electrode connected to the collector electrode of the third transistor; and fifth and sixth transistors connected in a serial manner having the emitter electrode of the sixth transistor connected with the collector electrode of the fifth transistor, where the base electrode of the fifth transistor is connected to the collector electrode of the second transistor, the emitter electrode of the fifth transistor receives a second constant current, and the base electrode of the sixth electrode is coupled with both the collector electrode of the sixth transistor and the base electrode of the fourth transistor, together connecting to the reference voltage.

12. The squaring cell of claim 11, wherein the first component and/or the second component include one of:

a diode with its anode terminal serving as a positive terminal and its cathode terminal as a negative terminal; and a transistor with its base electrode and its collector electrode coupled together, where the emitter electrode serves as a negative terminal and the collector electrode as a positive terminal.

13. The squaring cell of claim 11, wherein the second part comprises:

a seventh transistor with its emitter electrode receiving the second tail current, its base electrode connected to the collector electrode of the first transistor, and its collector electrode connected to the base electrode of the first transistor of the first part;

a third component with a third positive terminal and a third negative terminal having the third negative connected to the collector electrode of the seventh transistor and the third positive terminal connected to the reference voltage;

eighth and ninth transistors having emitter electrodes thereof coupled together receiving a third constant current, wherein the base electrode of the eighth transistor is connected to the emitter electrode of the seventh transistor;

a fourth component with a fourth positive terminal and a fourth negative terminal having the fourth negative terminal connected to the collector electrode of the eighth transistor and the fourth positive terminal connected to the reference voltage;

a tenth transistor having its collector electrode connected to the second output current and its emitter electrode connected to the collector electrode of the ninth transistor; and eleventh and twelfth transistors connected in a serial manner having the emitter electrode of the twelfth transistor connected with the collector electrode of the eleventh transistor, where the base electrode of the eleventh transistor is connected to the collector electrode of the eighth transistor, the emitter electrode of the eleventh transistor receives a fourth constant current, and the base electrode of the twelfth electrode is coupled with both the collector electrode of the twelfth transistor and the base electrode of the tenth transistor, together connecting to the reference voltage.

14. The squaring cell of claim 13, wherein the third component and/or the fourth component include one of:

a diode with its anode terminal serving as a positive terminal and its cathode terminal as a negative terminal; and a transistor with its base electrode and its collector electrode coupled together, where the emitter electrode serves as a negative terminal and the collector electrode as a positive terminal.

15. The squaring cell of claim 13, wherein the first or the third constant current is twice that of the DC quiescent current.

16. The squaring cell of claim 13, wherein the second or the fourth constant current is the same as the DC quiescent current.

17. A squaring cell, comprising:

a first component with a first positive terminal and a first negative terminal, wherein the first negative terminal receives a first tail current that is positively proportional to an input signal current and the first positive terminal is connected to a reference voltage; and a circuit coupled to the negative terminal of the first component and receiving a second tail current that is negatively proportional to the input signal current, the first component and the circuit being operative to develop a product of the first and second tail currents;

wherein an output current of the circuit correlates with the square of the input signal current.

18. The squaring cell of claim 17, wherein the output current is responsive to the first tail current and the second tail current.

19. The squaring cell of claim 17, wherein the first tail current is a summation of a constant current and the input signal current; and the second tail current is a subtraction between the constant current and the input signal current.

20. The squaring cell of claim 19, wherein the circuit comprises:

a first transistor with its emitter electrode receiving the second tail current, its base electrode connected to the negative terminal of the first component, and its collector electrode connected to a reference voltage, second and third transistors having emitter electrodes thereof coupled together receiving a first constant current, wherein the base electrode of the second transistor is connected to the emitter electrode of the first transistor and the collector electrode of the third transistor is connected to the output current, a second component with a positive terminal and a negative terminal, where the negative terminal is connected to the collector electrode of the second transistor and the positive terminal is connected to the reference voltage, and a fourth transistor having its base electrode connected to the collector electrode of the second transistor, its emitter electrode coupled with the base electrode of the third transistor receiving a second constant current, and its collector electrode connected to the reference voltage.

21. The squaring cell of claim 20, wherein the first component and/or the second component include one of:

a diode with its anode terminal serving as a positive terminal and its cathode terminal as a negative terminal; and a transistor with its base electrode and its collector electrode coupled together, where the emitter electrode serves as a negative terminal and the collector electrode as a positive terminal.

22. The squaring cell of claim 20, wherein the first constant current is twice that of the constant current; and the second constant current is the same as the constant current.

23. A squaring cell, comprising:

a first circuit with first and second connecting terminals and a first output current, receiving a first tail current that is positively proportional to an input signal current; and a second circuit with a corresponding first terminal and a corresponding second connecting terminal and a second output current, receiving a second tail current that is negatively proportional to the input signal current, the first and second circuits each being operative to develop a product of the first and second tail currents, wherein the first connecting terminal of the first circuit is coupled with the corresponding second connecting terminal of the second circuit and the second connecting terminal of the first circuit is coupled with the corresponding first connecting terminal of the second circuit, and a sum of the first output current and the second output current correlates to the square of the input signal current.

24. The squaring cell of claim 23, wherein the first output current and the second output current are responsive to the first tail current and the second tail current; and correlate with the square of the input signal current.

25. The squaring cell of claim 23, wherein the first tail current is a sum of a constant current and the input signal current; and the second tail current is a subtraction difference between the input signal current and the constant current.

26. The squaring cell of claim 25, wherein the first circuit further receives a first constant current and a second constant current; and the second circuit further receives a third constant current and a fourth constant current.

27. The squaring cell of claim 26, wherein the first constant current and the third constant current are twice that of the constant current; and the second constant current and the fourth constant current are the same as the constant current.

28. The squaring cell of claim 26, wherein the first circuit comprises:

a first transistor with its emitter electrode receiving the first tail current, its base electrode serving as the first connecting terminal, and its collector electrode serving as the second connecting terminal;

a first component with a first positive terminal and a first negative terminal having the first negative terminal connected to the collector electrode of the first transistor and the first positive terminal connected to a reference voltage;

second and third transistors having emitter electrodes thereof coupled together receiving the first constant current, where the base electrode of the second transistor is connected to the emitter electrode of the first transistor;

a second component with a second positive terminal and a second negative terminal having the second negative terminal connected to the collector electrode of the second transistor and the second positive terminal connected to the reference voltage;

a fourth transistor having its collector electrode connected to the first output current and its emitter electrode connected to the collector electrode of the third transistor; and fifth and sixth transistors connected in a serial manner having the emitter electrode of the sixth transistor connected with the collector electrode of the fifth transistor, where the base electrode of the fifth transistor is connected to the collector electrode of the second transistor, the emitter electrode of the fifth transistor receives the second constant current, and the base electrode of the sixth electrode is coupled with both the collector electrode of the sixth transistor and the base electrode of the fourth transistor, together connecting to the reference voltage.

29. The squaring cell of claim 28, wherein the first component and/or the second component include one of:

a diode with its anode terminal serving as a positive terminal and its cathode terminal as a negative terminal; and a transistor with its base electrode and its collector electrode coupled together, where the emitter electrode serves as a negative terminal and the collector electrode as a positive terminal.

30. The squaring cell of claim 29, wherein the second circuit comprises:

a seventh transistor with its emitter electrode receiving the second tail current, its base electrode serving as the corresponding second connecting terminal coupled to the collector electrode of the first transistor, and its collector electrode serving as the corresponding second connecting terminal coupled to the base electrode of the first transistor;

a third component with a third positive terminal and a third negative terminal having the third negative connected to the collector electrode of the seventh transistor and the third positive terminal connected to the reference voltage;

eighth and ninth transistors having emitter electrodes thereof coupled together receiving the third constant current, wherein the base electrode of the eighth transistor is connected to the emitter electrode of the seventh transistor;

a fourth component with a fourth positive terminal and a fourth negative terminal having the fourth negative terminal connected to the collector electrode of the eighth transistor and the fourth positive terminal connected to the reference voltage;

a tenth transistor having its collector electrode connected to the second output current and its emitter electrode connected to the collector electrode of the ninth transistor; and eleventh and twelfth transistors connected in a serial manner having the emitter electrode of the twelfth transistor connected with the collector electrode of the eleventh transistor, where the base electrode of the eleventh transistor is connected to the collector electrode of the eighth transistor, the emitter electrode of the eleventh transistor receives the fourth constant current, and the base electrode of the twelfth electrode is coupled with both the collector electrode of the twelfth transistor and the base electrode of the tenth transistor, together connecting to the reference voltage.

31. The squaring cell of claim 30, wherein the third component and/or the fourth component include one of:

a diode having its anode terminal serve as a positive terminal and its cathode terminal serve as a negative terminal; and a transistor with its base electrode and its collector electrode coupled together, where the emitter electrode serves as a negative terminal and the collector electrode serves as a positive terminal.

* * * * *